US011674289B2

(12) United States Patent
Okazaki (10) Patent No.: US 11,674,289 B2
(45) Date of Patent: Jun. 13, 2023

(54) REVOLVING WORK VEHICLE, AND METHOD FOR DETECTING POSITION OF WORKING END OF REVOLVING WORK VEHICLE

(71) Applicant: YANMAR POWER TECHNOLOGY CO., LTD., Osaka (JP)

(72) Inventor: Kohei Okazaki, Fukuoka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 103 days.

(21) Appl. No.: 16/975,969

(22) PCT Filed: Jan. 24, 2019

(86) PCT No.: PCT/JP2019/002156
§ 371 (c)(1),
(2) Date: Aug. 26, 2020

(87) PCT Pub. No.: WO2019/176314
PCT Pub. Date: Sep. 19, 2019

(65) Prior Publication Data
US 2020/0399868 A1    Dec. 24, 2020

(30) Foreign Application Priority Data
Mar. 13, 2018    (JP) .............................. JP2018-045415

(51) Int. Cl.
*E02F 9/26* (2006.01)
*B62D 33/08* (2006.01)
(Continued)

(52) U.S. Cl.
CPC .............. *E02F 9/264* (2013.01); *B62D 33/08* (2013.01); *E02F 3/32* (2013.01); *E02F 9/08* (2013.01)

(58) Field of Classification Search
None
See application file for complete search history.

(56) References Cited

U.S. PATENT DOCUMENTS

| 9,975,522 B2 * | 5/2018 | Nakamura | ............ E02F 9/2062 |
| 2003/0147727 A1 * | 8/2003 | Fujishima | ................ H04Q 9/10 |
| | | | 414/200 |

(Continued)

FOREIGN PATENT DOCUMENTS

| CN | 101413279 | * | 4/2009 |
| JP | 04-333730 A | | 11/1992 |

(Continued)

OTHER PUBLICATIONS

International Search Report for PCT Patent App. No. PCT/JP2019/002156 (dated Apr. 16, 2019).

*Primary Examiner* — Ronald P Jarrett
(74) *Attorney, Agent, or Firm* — Cermak Nakajima & McGowan LLP; Tomoko Nakajima (57) ABSTRACT

The present invention includes: a base carrier; a revolving superstructure provided above the base carrier in a manner capable of revolving; a boom bracket supported by the revolving superstructure in a horizontally rotatable manner; a work machine supported by the boom bracket in a vertically rotatable manner; a first position detecting device that detects a horizontal position of the boom bracket with respect to the revolving superstructure; a second position detecting device that detects a vertical position of the work machine with respect to the revolving superstructure; and an arithmetic unit that calculates a position of a working end of the work machine based on the results of detection by those position detecting devices.

12 Claims, 6 Drawing Sheets

(51) Int. Cl.
  *E02F 3/32* (2006.01)
  *E02F 9/08* (2006.01)

(56) References Cited

U.S. PATENT DOCUMENTS

| | | | | |
|---|---|---|---|---|
| 2010/0326481 | A1* | 12/2010 | Buckner | E02F 9/26 134/166 C |
| 2013/0066527 | A1* | 3/2013 | Mizuochi | E02F 9/24 701/50 |
| 2016/0121481 | A1* | 5/2016 | Borroni | B66C 13/20 700/256 |

FOREIGN PATENT DOCUMENTS

| | | |
|---|---|---|
| JP | 2002-181538 A | 6/2002 |
| JP | 2002-181539 A | 6/2002 |
| JP | 2016-098637 A | 5/2016 |

\* cited by examiner

| 11 | position detection device | 34 | main machine controller |
| 12 | position detection device | 35 | work machine controller |
| 12a | position sensor | 36 | display controller |
| 12b | position sensor | 36a | storage |
| 12c | position sensor | 36b | arithmetic unit |
| 19 | receiver | 37 | display |
| 33 | operation device | | |

REVOLVING WORK VEHICLE, AND METHOD FOR DETECTING POSITION OF WORKING END OF REVOLVING WORK VEHICLE

This application is a national phase entry under 35 U.S.C. § 371 of PCT Patent Application No. PCT/JP2019/002153, filed on Jan. 24, 2019, which claims priority under 35 U.S.C. § 119 to Japanese Patent Application No. 2018-045415, filed Mar. 13, 2018, both of which are incorporated by reference.

TECHNICAL FIELD

The present invention relates to a revolving work vehicle having a so-called boom swing function and to a method for detecting a position of a working end of a work machine provided in the revolving work vehicle.

BACKGROUND ART

In regard to a revolving work vehicle such as a backhoe, high-precision control is allowed by detecting a position of a working end (for example, a blade edge of a bucket) of a work machine, and the high-precision control is useful for automation of work and ensuring safety of a surrounding area. In Patent Literature 1, 2, a hydraulic shovel as the revolving work vehicle that includes means for detecting the position of the working end of the work machine is disclosed.

In order to improve workability in a small area, there is a case where a mini-shovel has a so-called boom swing function that not only allows the work machine to rotate vertically but also allows a base end of the work machine to rotate horizontally (that is, a boom swings to the right and left). A specific method for detecting the position of the working end with a high degree of accuracy has not been known for the revolving work vehicle with such a boom swing function.

In Patent Literature 1, a technique of detecting the position of the working end on the basis of output from a plurality of position sensors installed on the work machine and position information from two GPS antennas installed on a construction machine body is disclosed. However, in the case where this technology is adopted for the revolving work vehicle with the boom swing function, the position of the working end cannot be detected due to a change in a relative relationship between the output from the position sensors and the position information from the antennas caused by swing operation of the boom.

In Patent Literature 2, a technique of detecting a revolving center position of an arm on the basis of position information from a GPS antenna installed at a working end of the arm and position information from a GPS antenna installed on a construction machine body and further detecting a position of the working end on the basis of output from a plurality of position sensors has been disclosed. However, since it is necessary to install the antenna at the working end, to which a significant vibration and a significant impact are applied, this is inconvenient to detect the position of the working end with the high degree of accuracy.

CITATION LIST

Patent Literature

Patent Literature 1: Japanese Unexamined Patent Application Publication No. 2002-181538

Patent Literature 2: Japanese Unexamined Patent Application Publication No. 2002-181539

DISCLOSURE OF INVENTION

Problems to be Solved by the Invention

The present invention has been made in view of the above circumstances and therefore has an object to detect, with a high degree of accuracy, a position of a working end of a work machine in a revolving work vehicle having a boom swing function.

Means for Solving the Problems

A revolving work vehicle according to the present invention includes: a base carrier; a revolving superstructure provided above the base carrier in a manner capable of revolving; a swing body supported by the revolving superstructure in a horizontally rotatable manner; a work machine supported by the swing body in a vertically rotatable manner; a first position detecting device that detects a horizontal position of the swing body with respect to the revolving superstructure; a second position detecting device that detects a vertical position of the work machine with respect to the revolving superstructure; and an arithmetic unit that calculates a position of a working end of the work machine based on results of detection by the first and second position detecting devices. With such a configuration, in the revolving work vehicle having a boom swing function, it is possible to detect the position of the working end of the work machine with a high degree of accuracy.

The first position detecting device may include a position sensor that is installed on the swing body.

The work machine may include: a boom that is attached in a vertically rotatable manner to the swing body; an arm that is attached in a vertically rotatable manner to the boom; and a work attachment that is attached in a vertically rotatable manner to the arm, and the working end may be included in the work attachment. The second position measuring device may include: a position sensor that is installed on the boom; a position sensor that is installed on the arm; and a position sensor that is installed on a link for transmitting drive power to the work attachment.

A method for detecting a position of a working end of a revolving work vehicle according to the present invention is used for the revolving work vehicle including: a revolving superstructure provided above a base carrier in a manner capable of revolving; a swing body supported by the revolving superstructure in a horizontally rotatable manner; and a work machine supported by the swing body in a vertically rotatable manner, and includes: detecting a horizontal position of the swing body with respect to the revolving superstructure by a first position detecting device; detecting a vertical position of the work machine with respect to the revolving superstructure by a second position detecting device; and calculating the position of the working end of the work machine based on results of detection by the first and second position detecting devices. With such a method, in the revolving work vehicle having the boom swing function, it is possible to detect the position of the working end of the work machine with the high degree of accuracy.

DESCRIPTION OF EMBODIMENTS

A description will hereinafter be made on an embodiment of the present invention with reference to the drawings.

[Overview of Revolving Work Vehicle]

Figure 1:
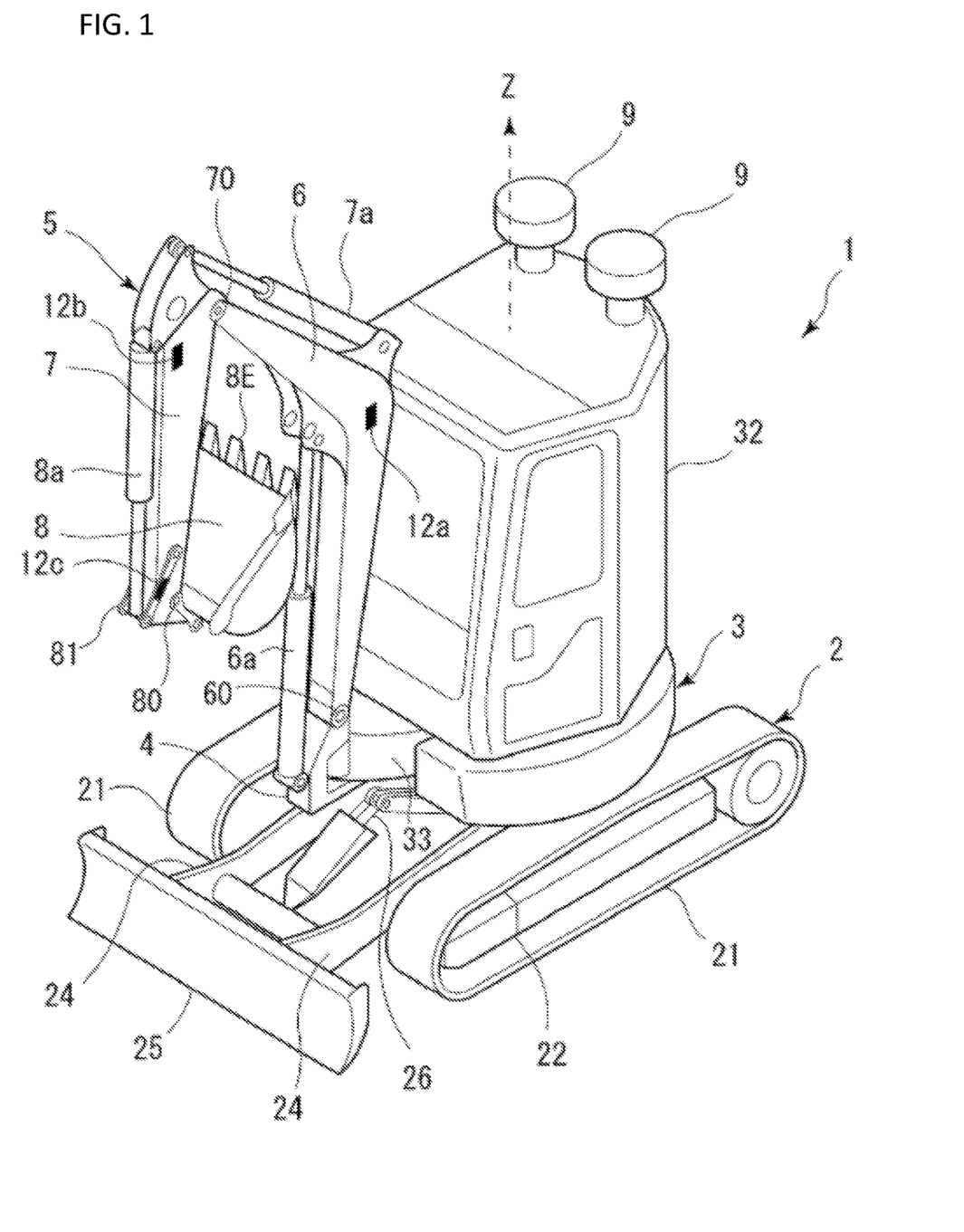
FIG. 1 is a perspective view illustrating an example of a revolving work vehicle according to the present invention.
Figure 2:
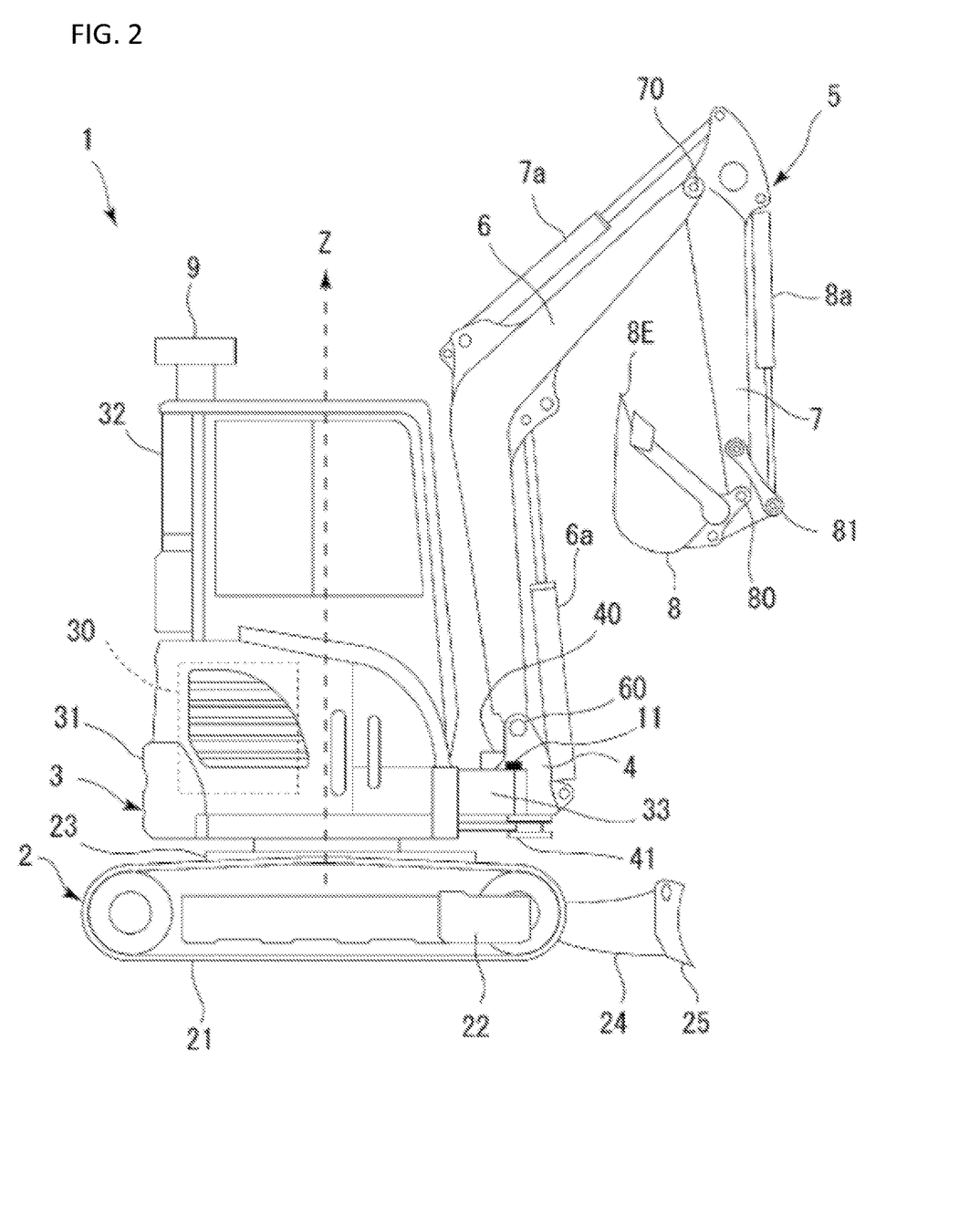
FIG. 2 is a right view of the revolving work vehicle in FIG. 1.

As illustrated in FIGS. 1 and 2, a revolving work vehicle 1 includes: a base carrier 2, a revolving superstructure 3 provided above the base carrier 2 in a manner capable of revolving; a boom bracket 4 that is a swing body supported by the revolving superstructure 3 in a manner capable of rotating horizontally; and a work machine 5 that is supported by the boom bracket 4 in a manner capable of rotating vertically. The revolving work vehicle 1 is configured as a shovel (a backhoe) with a boom swing function. In general, the boom swing function is provided in a mini-shovel, for which workability in a small area is requested.

The base carrier 2 is driven when receiving power from an engine 30, and thereby drives or rotates the revolving work vehicle 1. The base carrier 2 includes: a pair of right and left crawlers 21, 21; and a pair of right and left travel motors 22, 22 for driving those. Between the paired crawlers 21, 21, a base 23 is provided to support the revolving superstructure 3 in a manner to allow free revolution thereof. The base carrier 2 is also provided with: a pair of blade arms 24, 24; a blade 25 as an earth removing plate that extends in a right-left direction between tips of the blade arms 24, 24; and a blade cylinder 26 for vertically rotating the blade 25.

The revolving superstructure 3 is configured to be able to revolve around an axis that extends vertically at a center thereof. In FIGS. 1 and 2, a Z-axis that matches the axis is illustrated. The revolving superstructure 3 is substantially formed in a disc shape in a plan view and can revolve within a lateral width of the base carrier 2 (a space between an outer end edge of the left crawler 21 and an outer end edge of the right crawler 21). The engine 30, a counterweight 31, a cabin 32, and the like are disposed in the revolving superstructure 3. A driver section surrounded by the cabin 32 is equipped with: a driver's seat (not illustrated) on which an operator is seated; an operation device 33 (see FIG. 3) operated by the operator; a display 37 (see FIG. 3) that shows various types of information; and the like.

The boom bracket 4 is attached to a front end of the revolving superstructure 3 via a stay 33. The stay 33 is provided with a pivot pin 40, an axis a (see FIG. 4) of which is oriented vertically. The boom bracket 4 is supported in a manner to be freely and horizontally rotatable about the pivot pin 40 (that is, freely swingable to the right and left). The boom bracket 4 rotates on a horizontal plane that is orthogonal to the axis a (for example, an X-Y plane illustrated in FIG. 5). Between the revolving superstructure 3 and the boom bracket 4, a swing cylinder 41 is provided to extend/contract longitudinally. The boom bracket 4 is actuated for the horizontal rotation according to the extension/contraction of the swing cylinder 41.

The work machine 5 is driven when receiving the power from the engine 30, and thereby performs earth excavation work and the like according to an operation in the driver section. The work machine 5 is supported in a vertically rotatable manner by the boom bracket 4. The boom bracket 4 is provided with a pivot pin 60, an axis of which is oriented horizontally. A base end of the work machine 5 (a base end of a boom 6, which will be described below) is supported in a manner to be freely and vertically rotatable about the pivot pin 60. The work machine 5 rotates on a vertical plane (for example, an X-Z plane illustrated in FIG. 4) that is orthogonal to the axis of the pivot pin 60. In addition, the work machine 5 can perform the swing operation in an interlocking manner with the horizontal rotation of the boom bracket 4.

The work machine 5 has the boom 6, an arm 7, and a work attachment, and the working end is included in the work attachment. In the present embodiment, the excavation bucket 8 is attached as the work attachment, and a blade edge 8E serves as the working end. The boom 6 is attached to the boom bracket 4 in a vertically rotatable manner. The boom 6 extends vertically from the base end that is supported by the boom bracket 4, and is bent in a boomerang shape in a side view. Between the boom bracket 4 and an intermediate portion of the boom 6, a boom cylinder 6a that can move in a freely extendable/contractable manner is provided. A boom against the boom bracket 4 The vertical rotation of 6 operates according to the expansion and contraction of the boom cylinder 6a. The boom 6 is actuated for the vertical rotation with respect to the boom bracket 4 according to the extension/contraction of the boom cylinder 6a.

The arm 7 is attached in a vertically rotatable manner to the boom 6. At a tip of the boom 6, a pivot pin 70 is provided such that an axis thereof is oriented horizontally. A base end of the arm 7 is supported is a manner to be freely and vertically rotatable (longitudinally rotatable) about the pivot pin 70. Between the intermediate portion of the boom 6 and the base end of the arm 7, an arm cylinder 7a is provided to move in a freely extendable/contractable manner. The arm 7 is actuated for the vertical rotation with respect to the boom 6 according to the extension/contraction of the arm cylinder 7a.

The bucket 8 is attached in a vertically rotatable manner to the arm 7. At a tip of the arm 7, a pivot pin 80 is provided such that an axis thereof is oriented horizontally. A base end of the bucket 8 is supported is a manner to be freely and vertically rotatable (longitudinally rotatable) about the pivot pin 80. A bucket link 81 is interposed between the tip of the arm 7 and the bucket 8. The bucket link 81 is configured as a link that transmits drive power to the bucket 8. Between the bucket link 81 and the base end of the arm 7, a bucket cylinder 8a is provided to move in a freely extendable/contractable manner. The bucket 8 is actuated for the vertical rotation with respect to the arm 7 according to the extension/contraction of the bucket cylinder 8a.

[Control System of Revolving Work Vehicle]

Figure 3:
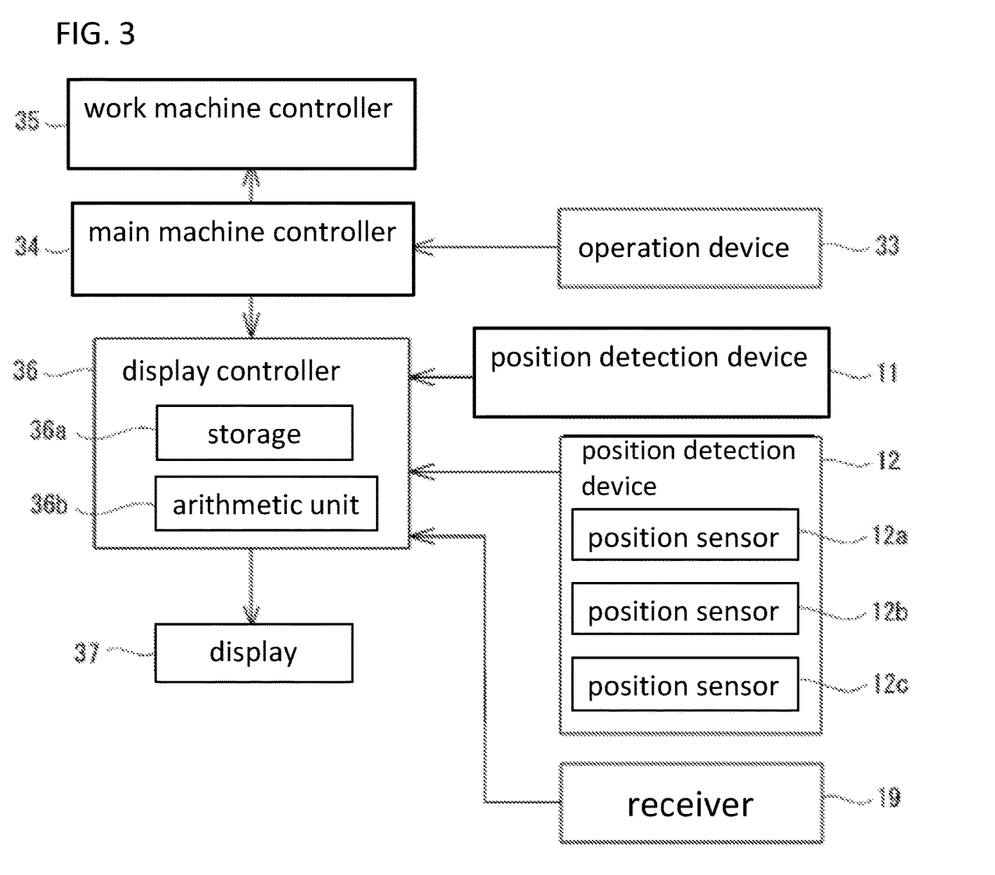
FIG. 3 is a block diagram illustrating a control system provided in the revolving work vehicle.

A brief description will be made on an example of a control system provided in the revolving work vehicle 1. As illustrated in FIG. 3, this revolving work vehicle 1 includes the operation device 33, a main machine controller 34 as a vehicle control device, and a work machine controller 35, a display controller 36 as a display control device, and the display 37. The operation device 33 includes a lever, a switch, a pedal, an operation panel, and the like. Based on a control signal from the operation device 33, the main machine controller 34 controls travel operation of the base carrier 2 and revolving operation of the revolving superstructure 3. In addition, based on a control signal from the operation device 33, the main machine controller 34 controls the work machine controller 35 and the display controller 36.

The work machine controller 35 controls operation of the work machine 5. This operation includes not only the vertical rotation of each of the boom 6, the arm 7, and the bucket 8 but also the horizontal rotation of the boom bracket 4 for the swing operation of the work machine 5. The display controller 36 includes: a storage 36a that is constructed with random-access memory (RAM), read-only memory (ROM), and the like; and an arithmetic unit 36b that is constructed with a central processing unit (CPU) and the like. The storage 36a stores various types of data as will be described below. The arithmetic unit 36b executes specified arithmetic processing on the basis of the data stored in the storage 36a, detection signals from position detecting devices 11, 12. The display controller 36 can display a result of the arithmetic processing on the display 37.

[Detection of Position of Working End]

Next, a description will be made on a method for detecting a position of the blade edge 8E of the bucket 8 as the working end. As illustrated in FIG. 3, the revolving work vehicle 1 includes the position detecting device 11 (a first position detecting device) and the position detecting device 12 (a second position detecting device). The position detecting device 11 detects a horizontal position of the boom bracket 4 with respect to the revolving superstructure 3. The position detecting device 12 detects a vertical position of the work machine 5 with respect to the revolving superstructure 3. The revolving work vehicle 1 also includes the arithmetic unit 36b that calculates a position of the blade edge 8E based on results of detection by these position detecting devices 11, 12.

In the present embodiment, the position detecting device 11 includes a position sensor that is installed on the boom bracket 4 as illustrated in FIG. 2. The position sensor detects movement on the plane on which the boom bracket 4 is movable, more specifically, movement on the horizontal plane that is orthogonal to the axis a of the pivot pin 40. By installing such a position sensor on the boom bracket 4, it is possible to relatively easily detect the horizontal position of the boom bracket 4 with respect to the revolving superstructure 3. In the present embodiment, an example in which an acceleration sensor is used as the position sensor constituting the position detecting device 11 so as to detect a swing angle θ2 of the boom bracket 4 with respect to the revolving superstructure 3 will be described.

The position sensor that constitutes the position detecting device 11 can also be installed in the swing cylinder 41. As the position sensor, an inertial sensor such as the acceleration sensor can be used as described above. However, the position sensor is not limited thereto. For example, a gyro sensor, an angle sensor (a tilt sensor), or a cylinder sensor (a stroke sensor) can also be used. In the case where the cylinder sensor is used, the swing angle θ2 is detected on the basis of an extension/contraction amount (a stroke amount) of the swing cylinder 41. In this way, it is possible to detect the horizontal position of the boom bracket 4 with respect to the revolving superstructure 3.

In the present embodiment, the position detecting device 12 includes: a position sensor 12a that is installed on the boom 6 as illustrated in FIG. 1; a position sensor 12b that is installed on the arm 7; and a position sensor 12c that is installed on the bucket link 81. Each of the position sensors 12a to 12c detects movement on a plane on which the work machine 5 is movable, more specifically, movement on the vertical plane including the axis a of the pivot pin 40. In the present embodiment, an example in which the acceleration sensors are used as the position sensors 12a to 12c so as to detect angles α, ß, γ will be described below. Similar to the position detecting device 11, the position sensor that constitutes the position detecting device 12 is not limited to the inertial sensor such as the acceleration sensor.

Figure 4:
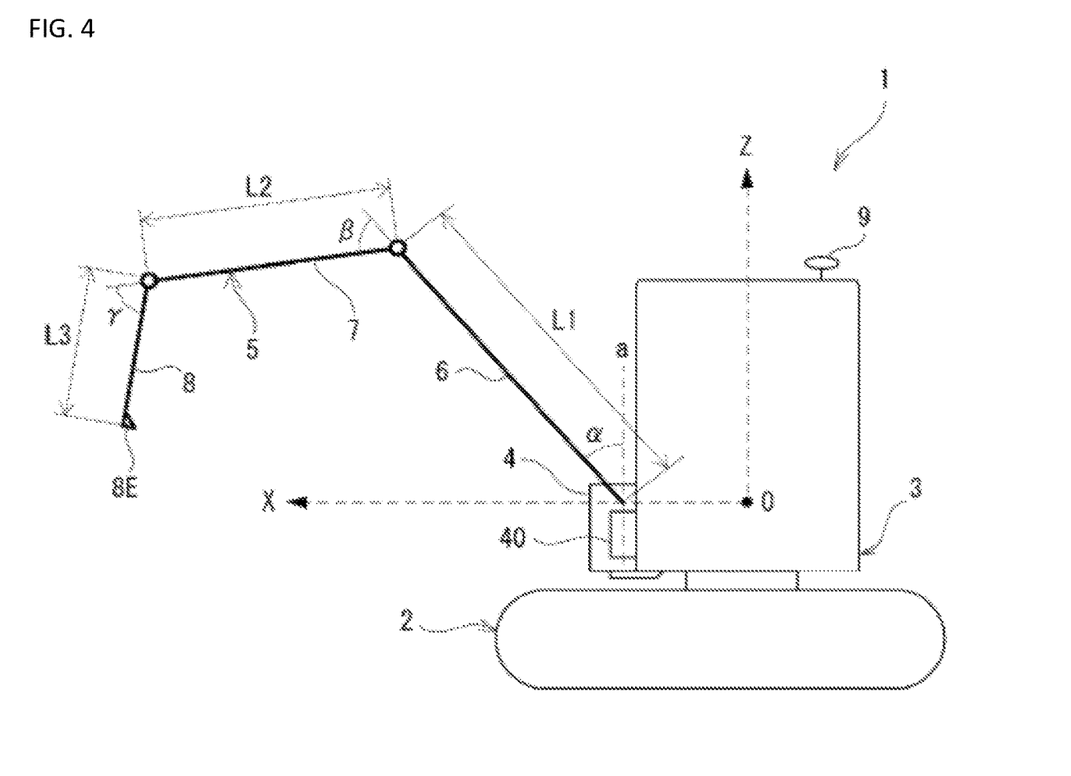
FIG. 4 is a left view conceptually illustrating a coordinate system and the revolving work vehicle.

FIG. 4 is a left view conceptually illustrating the coordinate system and the revolving work vehicle 1. This coordinate system is an orthogonal coordinate system defined by: an X-axis in the horizontal direction extending to the right and left in FIG. 4; a Y-axis (see FIG. 5) in the horizontal direction that is orthogonal to the sheet of FIG. 4; and a Z-axis in the vertical direction extending vertically in FIG. 4. The X-axis extends in a front-rear direction of the base carrier 2, and the Y-axis extends in the right-left direction (a width direction) of the base carrier 2. The Z-axis matches the axis that is the center of revolution of the revolving superstructure 3. The X-Y plane including an origin O is located at a height of the axis of the pivot pin 60, and the axis a of the pivot pin 40 crosses the X-Y plane at a right angle.

Figure 5:
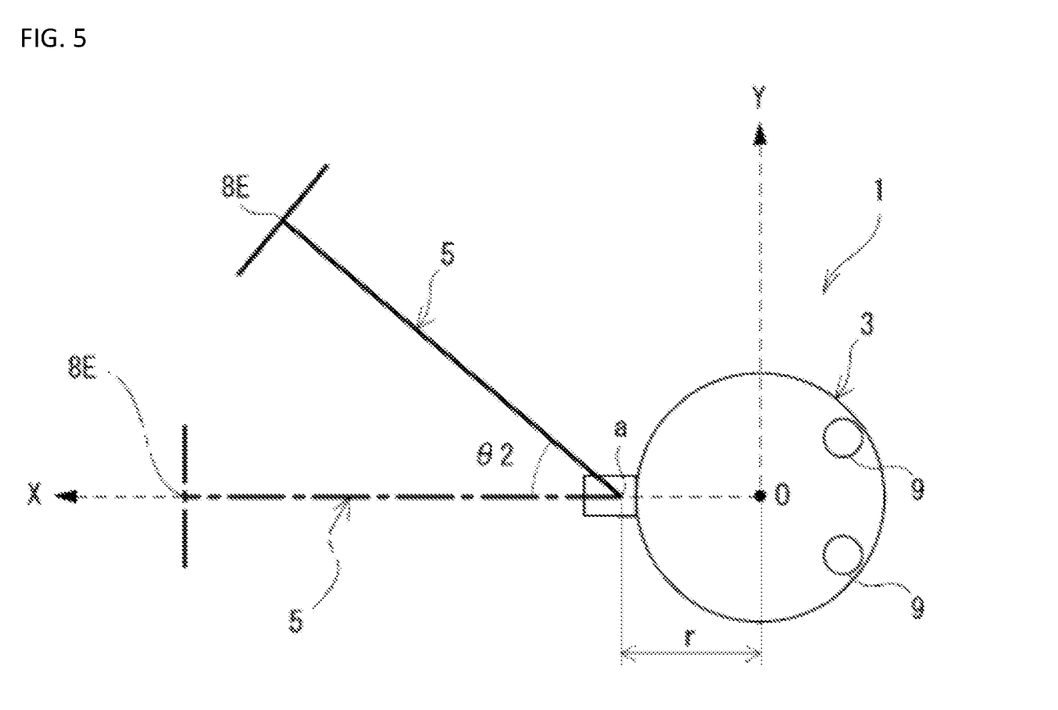
FIG. 5 is a plan view conceptually illustrating the coordinate system and the revolving work vehicle.

FIG. 5 is a plan view conceptually illustrating the coordinate system and the revolving work vehicle 1. The position of the work machine 5 illustrated in FIG. 4 is indicated by a chain line in FIG. 5. In FIGS. 4 and 5, the axis a of the pivot pin 40 is located on the X-axis. This state is set as a reference of a revolution angle θ1 (see FIG. 6) of the revolving superstructure 3 with respect to the base carrier 2, and the revolution angle θ1 is zero in FIGS. 4 and 5. In addition, in FIG. 4, the work machine 5 is arranged on the vertical plane (the X-Z plane) that includes the axis a of the pivot pin 40 and the Z axis. This state is set as a reference of the swing angle θ2 of the boom bracket 4 with respect to the revolving superstructure 3, and the swing angle θ2 is zero in FIG. 4.

In FIG. 4, the work machine 5 is in a movable state on the X-Z plane, that is, each of the boom 6, the arm 7, and the bucket 8 is in a state capable of rotating vertically (rotating longitudinally) on the X-Z plane. The angle α is a tilt angle (a rotation angle) of the boom 6 with the axis a of the pivot pin 40 being a reference. The angle ß is a tilt angle (a rotation angle) of the arm 7 with an extending direction of the boom 6 (a direction of a length L1) being a reference. The angle γ is a tilt angle (a rotation angle) of the bucket 8 with an extending direction of the arm 7 (a direction of a length L2) being a reference. As it has already been described, these angles α, ß, γ can respectively be detected by the position sensors 12a to 12c that constitute the position detecting device 12.

The length L1 is a length from the base end to the tip of the boom 6, more specifically, corresponds to a linear distance from the axis of the pivot pin 60 to the axis of the pivot pin 70. The length L2 is a length from the base end to the tip of the arm 7, more specifically, corresponds to a linear distance from the axis of the pivot pin 70 to the axis of the pivot pin 80. A length L3 is a length from the base end to the tip of the bucket 8, more specifically, corresponds to a linear distance from the axis of the pivot pin 80 to the blade edge 8E. Data on the lengths L1 to L3 is stored in the storage 36a in advance.

The revolving work vehicle 1 in the present embodiment includes two GPS antennas 9, 9. A receiver 19 (see FIG. 3) receives three-dimensional position information of the antennas 9, 9. The antennas 9, 9 are fixed to specified positions of the revolving work vehicle 1. In the present embodiment, the antennas 9, 9 are arranged on a horizontal plane that is parallel to the X-Y plane. A relative position of the axis (that is, the Z-axis) that serves as the center of revolution of the revolving superstructure 3 to the antennas 9, 9 and thus a relative position (global coordinates) of the origin O is comprehended in advance on the basis of a specification of the revolving work vehicle 1 or measurement in advance, and data thereon is stored in the storage 36a.

Figure 6:
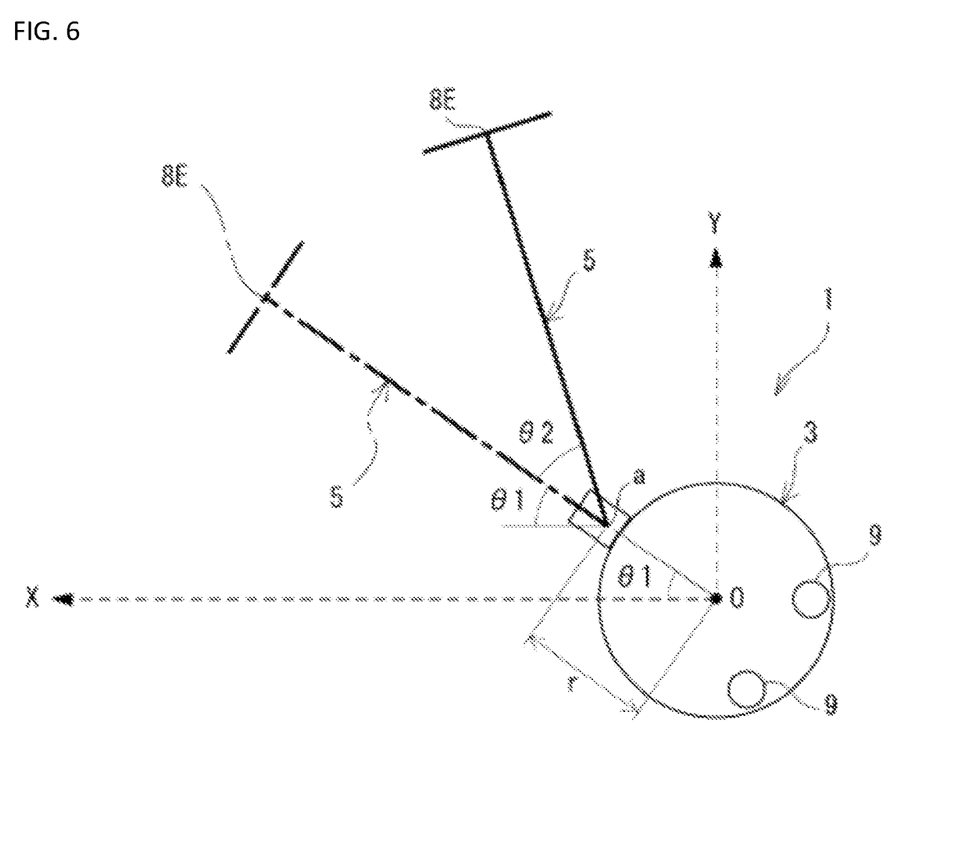
FIG. 6 is a plan view conceptually illustrating the coordinate system and the revolving work vehicle.

Similar to FIG. 5, FIG. 6 is a plan view conceptually illustrating the coordinate system and the revolving work vehicle 1, but differs from FIG. 5 in a point that the revolving superstructure 3 revolves. In FIG. 6, the position of the work machine 5 at the time when the swing angle θ2 is zero is indicated by a chain line. Since a revolution radius r of the axis a can be comprehended in advance, the data thereon is stored in the storage 36a. The revolution angle θ1 of the revolving superstructure 3 with respect to the base carrier 2 can be calculated on the basis of the three-dimensional position information of the antennas 9, 9 and the data stored in the storage 36a, and processing thereof is executed by the arithmetic unit 36b. As long as information required for the calculation of the revolution angle θ1 is acquired, installation positions of the antennas 9, 9 on the revolving work vehicle 1 are not particularly limited.

First, as indicated by the chain lines in FIG. 4 and FIG. 5, in a state where the revolving superstructure 3 does not revolve and the work machine 5 does not swing (that is, θ1=0, θ2=0), when three-dimensional coordinates of the blade edge 8E with the position of the axis a on the X-Y plane being set as a base point are set as (Xa, Ya, Za), such coordinates (Xa, Ya, Za) can be calculated by the following formulas.

$$Xa = L1\sin\alpha + L2\sin(\alpha+\beta) + L3\sin(\alpha+\beta+\gamma)$$

$$Ya = 0$$

$$Z1 = L1\cos\alpha + L2\cos(\alpha+\beta) + L3\cos(\alpha+\beta+\gamma)$$

Next, as indicated by a solid line in FIG. 5, in a state where the revolving superstructure 3 does not revolve and the work machine 5 swings (that is, θ1=0, θ2≠0), when the three-dimensional coordinates of the blade edge 8E with the position of the axis a on the X-Y plane being set as the base point are set as (Xa1, Ya1, Za1), such coordinates (Xa1, Ya1, Za1) can be calculated by the following formulas.

$$Xa1 = Xa \cdot \cos\theta2$$
$$= \{L1\sin\alpha + L2\sin(\alpha+\beta) + L3\sin(\alpha+\beta+\gamma)\}\cos\theta2$$

$$Ya1 = Xa \cdot \sin\theta2$$
$$= \{L1\sin\alpha + L2\sin(\alpha+\beta) + L3\sin(\alpha+\beta+\gamma)\}\sin\theta2$$

$$Za1 = Z1$$
$$= L1\cos\alpha + L2\cos(\alpha+\beta) + L3\cos(\alpha+\beta+\gamma)$$

Then, as illustrated in FIG. 6, in a state where the revolving superstructure 3 revolves (θ1≠0), when three-dimensional coordinates of the axis a with the origin O on the X-Y plane being a base point is set as (X∘0, Y∘0, Z∘0) and the revolution radius of the axis a is set as r, such coordinates (X∘0, Y∘0, Z∘0) can be calculated by the following formulas.

$$X\circ 0 = r \cdot \cos\theta1$$

$$Y\circ 0 = r \cdot \sin\theta1$$

$$Z\circ 0 = 0$$

Thereafter, as indicated by the chain line in FIG. 6, in a state where the revolving superstructure 3 revolves and the work machine 5 does not swing (θ1≠0, θ2=0), when the three-dimensional coordinates of the blade edge 8E with the origin O on the X-Y plane being the base point is set as (X∘1, Y∘1, Z∘1), such coordinates (X∘1, Y∘1, Z∘1) can be calculated by the following formulas.

$$X\circ 1 = Xa \cdot \cos\theta1 + X\circ 0$$
$$= \{L1\sin\alpha + L2\sin(\alpha+\beta) + L3\sin(\alpha+\beta+\gamma)\}\cos\theta1 + r \cdot \cos\theta1$$

$$Y\circ 1 = Xa \cdot \sin\theta1 + Y\circ 0$$
$$= \{L1\sin\alpha + L2\sin(\alpha+\beta) + L3\sin(\alpha+\beta+\gamma)\}\sin\theta1 + r \cdot \sin\theta1$$

$$Z\circ 1 = Za + Z\circ 0$$
$$= L1\cos\alpha + L2\cos(\alpha+\beta) + L3\cos(\alpha+\beta+\gamma)$$

Furthermore, as indicated by a solid line in FIG. 6, in a state where the revolving superstructure 3 revolves and the work machine 5 swings (θ1 0, θ2≠0), when the three-dimensional coordinates of the blade edge 8E with the origin O on the X-Y plane being the base point is set as (X∘2, Y∘2, Z∘2), such coordinates (X∘2, Y∘2, Z∘2) can be calculated by the following formulas.

$$X\circ 2 = Xa \cdot \cos(\theta1 + \theta2) + X\circ 0$$
$$= \{L1\sin\alpha + L2\sin(\alpha+\beta) + L3\sin(\alpha+\beta+\gamma)\}\cos(\theta1+\theta2) + r \cdot \cos\theta1$$

$$Y\circ 2 = Xa \cdot \sin(\theta1 + \theta2) + Y\circ 0$$
$$= \{L1\sin\alpha + L2\sin(\alpha+\beta) + L3\sin(\alpha+\beta+\gamma)\}\sin(\theta1+\theta2) + r \cdot \sin\theta1$$

$$Z\circ 2 = Za + Z\circ 0$$
$$= L1\cos\alpha + L2\cos(\alpha+\beta) + L3\cos(\alpha+\beta+\gamma)$$

Thus, when the global coordinates of the origin O are set as (A, B, C), by converting the three-dimensional coordinates (X∘2, Y∘2, Z∘2) of the blade edge 8E by the following formulas, the global coordinates (Xg2, Yg2, Zg2) of the blade edge 8E can be calculated.

$$Xg2 = X\circ 2 + A$$
$$= \{L1\sin\alpha + L2\sin(\alpha+\beta) + L3\sin(\alpha+\beta+\gamma)\}\cos(\theta1+\theta2) + r \cdot \cos\theta1 + A$$

$$Yg2 = Y\circ 2 + B$$
$$= \{L1\sin\alpha + L2\sin(\alpha+\beta) + L3\sin(\alpha+\beta+\gamma)\}\sin(\theta1+\theta2) + r \cdot \sin\theta1 + B$$

$$Z\circ 2 = Z\circ 2 + C$$
$$= L1\cos\alpha + L2\cos(\alpha+\beta) + L3\cos(\alpha+\beta+\gamma) + C$$

As described above, in the present embodiment, the horizontal position of the boom bracket 4 with respect to the revolving superstructure 3 (and thus the swing angle θ2) is detected by the position detecting device 11, the vertical direction of the work machine 5 with respect to the revolving superstructure 3 (and thus is the angles α, ß, γ) is detected by the position detecting device 12, and the position of the blade edge 8E calculated based on those results of detection. The arithmetic unit 36b executes such arithmetic processing with appropriate reference to the data stored in the storage 36a and the information sent from the receiver 19. The calculation result can be notified to the operator by showing the calculation result on the display 37, for example.

As it has been described so far, according to the present embodiment, it is possible to detect the position of the blade edge 8E, which is the working end of the work machine 5, in the revolving work vehicle 1, that has a boom swing function, with a high degree of accuracy.

In the present embodiment, an example in which the three-dimensional position of the working end is calculated has been described. However, a two-dimensional position thereof may be calculated. For example, such a display system for the hydraulic shovel has conventionally been known. The display system shows a mutual positional relationship between a work line (a target excavation line) and the working end as a two-dimensional image and thereby allows the operator to appropriately excavate a required place. The present invention can be applied to such a display system in order to display the working end. In such a display system, the work line can be created by setting the working end of the work machine as a work start point. Thus, it is not necessary to use the global coordinates, and the GPS antennas can be eliminated. In such a case, it may be configured that the revolution angle of the revolving superstructure with respect to the base carrier is detected by the position sensor (for example, the angle sensor) installed on the revolving superstructure.

The present invention is not limited to the above-described embodiment in any respect, and various improvements and modifications can be made thereto within the scope that does not depart from the gist of the present invention.

DESCRIPTION OF REFERENCE NUMERALS

1 Revolving work vehicle
2 Base carrier
3 Revolving superstructure
4 Boom bracket (swing body)
5 Work machine
6 Boom
7 Arm
8 Bucket (work attachment)
8a Bucket cylinder
8E Blade edge (working end)
11 First position detecting device
12 Second position detecting device
36b Arithmetic unit

The invention claimed is:

1. A revolving work vehicle comprising:
a base carrier;
a revolving superstructure provided above the base carrier in a manner capable of revolving;
a swing body supported by the revolving superstructure in a horizontally rotatable manner about a center axis of the revolving superstructure and about an axis parallel to the center axis;
a work machine supported by the swing body in a horizontally rotatable manner about the axis parallel to the center axis and in a vertically rotatable manner;
a GPS antenna installed at a predetermined position, wherein a horizontal revolution angle about the center axis of the revolving superstructure to calculate a position of the axis is calculated based on information obtained by the GPS antenna;
a first position detecting sensor that is installed on the swing body and that detects a horizontal movement of the swing body about the axis; and
a second position detecting sensor that is installed on the work machine and that detects a vertical movement of the work machine.

2. The revolving work vehicle according to claim 1, wherein
the work machine includes: a boom that is attached in a vertically rotatable manner to the swing body; an arm that is attached in a vertically rotatable manner to the boom; and a work attachment that is attached in a vertically rotatable manner to the arm, a working end being included in the work attachment, and
second position detecting sensor includes: a position sensor that is installed on the boom; a position sensor that is installed on the arm; and a position sensor that is installed on a link for transmitting drive power to the work attachment.

3. The revolving work vehicle according to claim 1, further comprising:
an arithmetic unit that calculates a position of a working end of the revolving work vehicle based on results of detection by the first and second position detecting sensors.

4. The revolving work vehicle according to claim 1, wherein the work machine is rotatably connected to the swing body at a bottom of the work machine.

5. The revolving work vehicle according to claim 1, wherein the work machine performs a swing operation which is operated coupled with a horizontal rotation of the swing body.

6. The revolving work vehicle according to claim 1, wherein the GPS antenna is composed of at least two GPS antenna members.

7. The revolving work vehicle according to claim 1, wherein the work machine
rotates horizontally about a first pivot pin oriented vertically in the swing body, the first pivot pin being coaxial with the axis.

8. A method for detecting a position of a working end of a revolving work vehicle, the method being used for the revolving work vehicle including: a revolving superstructure provided above a base carrier in a manner capable of revolving; a swing body supported by the revolving superstructure in a horizontally rotatable manner about a center axis of the revolving superstructure and about an axis parallel to the center axis; and a work machine supported by the swing body in a horizontally rotatable manner about the axis parallel to the center axis and in a vertically rotatable manner, the method for detecting the position of the working end of the revolving work vehicle comprising:
calculating a horizontal revolution angle about the center axis of the revolving superstructure to calculate a position of the axis, based on information obtained by a GPS antenna installed at a predetermined position;
detecting a horizontal movement of the swing body about the axis by a first position detecting sensor;
detecting a vertical movement of the work machine by a second position detecting sensor; and
calculating the position of the working end of the work machine based on results of detection by the first and second position detecting sensors.

9. The method according to claim 8, wherein the work machine is rotatably connected to the swing body at a bottom of the work machine.

10. The method according to claim 8, wherein the work machine performs a swing operation which is operated coupled with a horizontal rotation of the swing body.

11. The method according to claim 8, wherein the GPS antenna is composed of at least two GPS antenna members.

12. The method according to claim 8, wherein the work machine rotates horizontally about a first pivot pin oriented vertically in the swing body, the first pivot pin being coaxial with the axis.

\* \* \* \* \*